(12) United States Patent
Brett

(10) Patent No.: US 7,190,391 B2
(45) Date of Patent: Mar. 13, 2007

(54) IMAGE PROCESSING

(75) Inventor: Stephen David Brett, Kent (GB)

(73) Assignee: Pandora International Limited, Kent (GB)

( * ) Notice: Subject to any disclaimer, the term of this patent is extended or adjusted under 35 U.S.C. 154(b) by 426 days.

(21) Appl. No.: 10/237,845

(22) Filed: Sep. 9, 2002

(65) Prior Publication Data
US 2003/0071897 A1 Apr. 17, 2003

(30) Foreign Application Priority Data
Sep. 7, 2001 (GB) ................................ 0121737.1

(51) Int. Cl.
H04N 3/36 (2006.01)
(52) U.S. Cl. ..................................... 348/97
(58) Field of Classification Search ............ 348/97–98, 348/42, 675; 358/450; 382/675; 715/723; 345/419; H04N 3/36
See application file for complete search history.

(56) References Cited

U.S. PATENT DOCUMENTS

| 4,096,523 | A | | 6/1978 | Belmares-Sarabia et al. |
| 4,272,780 | A | | 6/1981 | Belmares-Sarabia et al. |
| 5,191,645 | A | * | 3/1993 | Carlucci et al. ............ 715/723 |
| 5,255,083 | A | | 10/1993 | Capitant et al. |
| 5,850,471 | A | * | 12/1998 | Brett .......................... 382/162 |
| 6,208,348 | B1 | * | 3/2001 | Kaye .......................... 345/419 |
| 6,215,485 | B1 | | 4/2001 | Phillips |
| 6,271,908 | B1 | | 8/2001 | Brett et al. |
| 6,351,321 | B1 | * | 2/2002 | McIntyre et al. ............ 358/450 |
| 6,671,000 | B1 | * | 12/2003 | Cloutier ...................... 348/675 |
| 2001/0033295 | A1 | | 10/2001 | Phillips |

FOREIGN PATENT DOCUMENTS

GB 2 246 925 A 2/1992

OTHER PUBLICATIONS

Search Report from United Kingdom Application No. GB 0220887.4, dated Feb. 11, 2003.
Search Report from United Kingdom Application No. GB 0220887.4, dated Oct. 21, 2003.

* cited by examiner

Primary Examiner—Tung Vo
(74) Attorney, Agent, or Firm—McDonnell Boehnen Hulbert & Berghoff LLP

(57) ABSTRACT

A method of scanning cinematographic film to produce digital images corresponding to images on frames of the film is provided, comprising the steps of:
 scanning the film and storing the digital images obtained;
 defining a first set of appearance attribute corrections to be applied to the images;
 storing a first set of appearance attribute correction parameters corresponding to the first set of appearance attribute corrections;
 defining at least one further set of appearance attribute corrections to be applied to the corrected images;
 storing a set of appearance attribute correction parameters corresponding to the or each of the further sets of appearance attribute corrections; and
 applying each of the stored sets of appearance attribute correction parameters to the stored images at one time.

5 Claims, 3 Drawing Sheets

IMAGE PROCESSING

INTRODUCTION

The present invention relates to image processing and in particular to the conversion of film images to video images and the appearance attribute correction of such images.

BACKGROUND TO THE INVENTION

Currently, there exist specialist machines ("telecine" machines) to scan cinema style motion picture film, and derive electrical signals for recording onto video tape or broadcasting as television pictures. One example of this is the 'URSA'$^{RTM}$ telecine manufactured by Cintel International Limited in Ware, England. Machines for scanning film at resolutions higher than those required for television and/or in non-real time are also known.

It is known to provide appearance attribute correction means in these telecines such that scenes may be studied, and an appearance attribute correction data set may be determined for individual scenes. The appearance attributes to be corrected could for example be chrominance, luminance or saturation of an image or they could be attributes relating to other characteristics of the image such as for example, sharpness or texture. The process of building up a series of appearance attribute correction values for a number of scenes, which is then used in a real time 'transfer' mode to effect the appearance attribute correction is taught in U.S. Pat. No. 4,096,523. An example of a telecine controller and programmer embodying such a process is the 'POGLE' produced by Pandora International Limited. In such a system, the appearance attribute correction data set is obtained by an operator viewing a scanned image on a monitor screen and manually adjusting the colour of the image until he is happy with the result. The manual adjustments made by the controller are then stored so that they can be applied as the image is rescanned as described above.

It is also known to provide a digital video processor downstream of the telecine machine which can carry out more detailed colour corrections at the request of a user than would be possible within the telecine machine. Examples of digital video processors are the DCP manufactured by Pandora International Limited (described in UK patent application No. GB 2278514A) and the 'Megadef', also manufactured by Pandora International Limited.

In the past, telecine machines were used to produce video images for television at standard definition with an aspect ratio of 4:3. However, television images are now produced at either standard definition or high definition and the aspect ratio can be either 4:3, 14:9 or 16:9. In addition, telecine machines and film scanners are being used increasingly to scan film at much higher resolutions than is required for television, such as at a resolution of 2000 lines by 3000 pixels or higher ("film resolution").

Consequently, there is a need to provide a system for processing digital images obtained from scanning cinematographic film which provides good accuracy independent of the resolution at which the film has been scanned.

In prior art systems, digital images obtained by a telecine machine would be viewed in the editing suite by a first operator. This would usually be somebody relatively junior and he would apply a first set of colour or appearance attribute corrections to the images obtained and the amended images would then be stored. Subsequently, further fine tuning to the colour corrections would be carried out (usually by a more senior operator). To do this, the operator would retrieve and view the stored corrected image and would apply further colour corrections to that corrected image.

Each set of corrections applied to the image are usually implemented by processing through one or more look-up tables containing the required corrections. The problem with this is that the look-up tables crush the data passing through them unless no change is made to the data. Thus, each time that a new set of corrections are applied to the image and the corrected image is subsequently stored, some more data will be lost. As many different sets of corrections will often be made to an image before it is ready to be broadcast or recorded onto video tape for public viewing, the final quality of the image obtained may be substantially worse than that originally produced by the telecine.

SUMMARY OF THE INVENTION

From one aspect, the present invention seeks to overcome the above problem by providing a method of scanning cinematographic film to produce digital images corresponding to images on frames of the film, comprising the steps of: scanning the film and storing the digital images obtained; defining a first set of appearance attribute corrections to be applied to the images; storing a first set of appearance attribute correction parameters corresponding to the first set of corrections; defining at least one further set of appearance attribute corrections to be applied to the corrected images; storing a set of appearance attribute correction parameters corresponding to the or each of the further sets of corrections; and applying each of the stored sets of appearance attribute correction parameters to the stored images at one time.

Using the method described above, the digital image data obtained need only be processed through a single look-up table or set of look-up tables incorporating all of the stored appearance attribute correction parameters. It will be appreciated that this is equally advantageous where means other than look-up tables are used to make the corrections to the image data. Thus the quality of image obtained after a number of sets of colour or appearance attribute corrections can be substantially improved.

As a further development of the present invention, a set of appearance attribute correction parameters defining a particular look or feel favoured by a director or colourist could be programmed into the means for applying a colour correction to the digital images obtained. Thus, these corrections could be applied together with the first and further stored sets of appearance attribute correction parameters to emulate that look or feel in the final images obtained.

An advantage of the invention is that initial colour corrections are often carried out on digital images obtained at relatively low resolution. The reason for this is that it is very time consuming to scan every frame of a film at high resolution and it is not deemed to be necessary when only general corrections to the overall colour of an image are being made. However, previously these initial colour corrections have often been applied to the relatively low resolution images and have then been interpolated up to a higher resolution when more accurate colour corrections are being carried out. This again decreases the quality of the final images obtained.

Using the present invention as described above, parameters corresponding to the initial colour corrections applied to the images would be stored for later use as instruction files which were not dependent on the bit-depth or spatial resolution of the image. Any further corrections required (which would probably be determined using images of a higher resolution) would be stored in the same way. Then, once all the corrections had been decided on, the film would be rescanned at whatever resolution was required and the instruction files would be applied to the digital images obtained at that resolution.

In the prior art, corrections to the image data were carried out using more than one channel of a colour corrector, each channel defining the corrections to be made to a contiguous range of colours in an image. In one particularly preferred embodiment of the invention, the method comprises the further steps of combining each of the sets of appearance attribute correction parameters into a single set of appearance attribute correction parameters and applying the single set of appearance attribute correction parameters to the stored images.

Preferably, each of the sets of appearance attribute correction parameters are defined in separate data processing channels of a colour corrector and the single set of combined appearance attribute correction parameters is applied to the stored images via a single channel of the colour corrector.

In one preferred form, each of the sets of appearance attribute correction parameters are defined by respective look-up tables in separate data processing channels of a colour corrector and the respective look-up tables are combined into a single look-up table to be applied to the stored images via a single channel of the colour corrector.

A related problem in the prior art is that of defining an outline around an object. As described in UK patent application numbers GB 2297217 A and GB 2317298 A, various methods of selecting an object in an image without an operator having to physically draw around it are known in the art. However, in some instances, the most accurate means of identifying an object is by drawing around it. This might for example be the case where the objects surrounding the object to be selected had very similar colour characteristics.

In the past, when selecting an object by drawing around it, the outline of the object would be stored by storing the x,y position of each of the pixels falling on the outline of the object in the image at the resolution of the image on the monitor screen viewed by the operator. This had the problem that, if the image was subsequently scanned at a higher resolution, the object could only be inaccurately identified as the outline of the object had to be interpolated up to fit the higher resolution image.

According to a further aspect of the invention therefore, a method of identifying an object in a digital image obtained by scanning a frame of cinematographic film is provided in which: the digital image is displayed on a monitor screen at a first resolution; the object is drawn around by an operator and a description of the shape of that object is stored in data processing means such that the shape of the object can be accurately reproduced in a digital image obtained by scanning the film frame at a second resolution higher than the first.

Thus, with the method of the invention as described above, it is no longer necessary to interpolate to identify the object in the higher resolution image and so the object may be identified more accurately than in the prior art methods.

The description of the shape of the object might be obtained by storing every point in the data stream provided by the pointer or pen as the operator draws around the object on the monitor screen. This data stream is at a very high resolution such that it would not be necessary to interpolate up from this data even when an image was produced at a much higher resolution.

In an alternative, the description of the shape of the object could be a function defining the shape of the object. Thus, in one example, the object drawn around might be a circle having a radius of one third the height of the digital image. The shape of the circle could merely be stored as the function of the circle and this would allow the object to be accurately reproduced at any resolution.

In a further development of the invention, it has been realised that some colour corrections applied to digital images are dependent on the time elapsed while others are not.

As is well known, cinematographic film is supplied to editing suites on a series of reels. These reels are shot on location and contain a number of scenes or takes. The order of the scenes or takes on the reels does not necessarily correspond to the order in which the director wishes those scenes to appear in the final cut and, indeed, usually at least some of the scenes will not appear in that final cut. Thus, an editing process is carried out in which the scenes which are required are placed into order and a time code dictating this order is then applied to the scanned digital images corresponding to each frame from each of those scenes. One system for editing the scenes on a film to place them into a required order is provided by the AVID range of products of the Lightworks System.

Some of the colour corrections applied to the images such as for example, corrections for the overall level of exposure or corrections for a particular colour which the colourist does not like, are not dependent on the time code or the order of the scenes. However, the director might wish to colour correct a series of, for example, four scenes which had been shot at midday to give the impression that the sun was gradually going down. In this case, the operator could tie the colour corrections relating to the sunset to the time code.

This method is believed to be novel and inventive in its own right and so, from a further aspect, the present invention provides a method of scanning frames of cinematographic film to produce digital images corresponding to the images on the film frames, applying a time code dictating the order in which the images are to be played to the digital images, and correcting the digital images based on a set of appearance attribute correction parameters which are defined as a function of the time code.

As will be appreciated above, the present invention provides a new visual programming language for use in the processing of digital images which has many new and advantageous features.

BRIEF DESCRIPTION OF THE DRAWINGS

Preferred embodiments of the invention will now be described, by way of example only, and with reference to the accompanying drawings in which.

DESCRIPTION OF THE PREFERRED EMBODIMENTS

As is well known in the art, telecine machines are used to convert images from frames of cinematographic film to digital images. In order to produce a finalised set of digital images to be broadcast, various corrections are then made to the digital image data.

Figure 1:
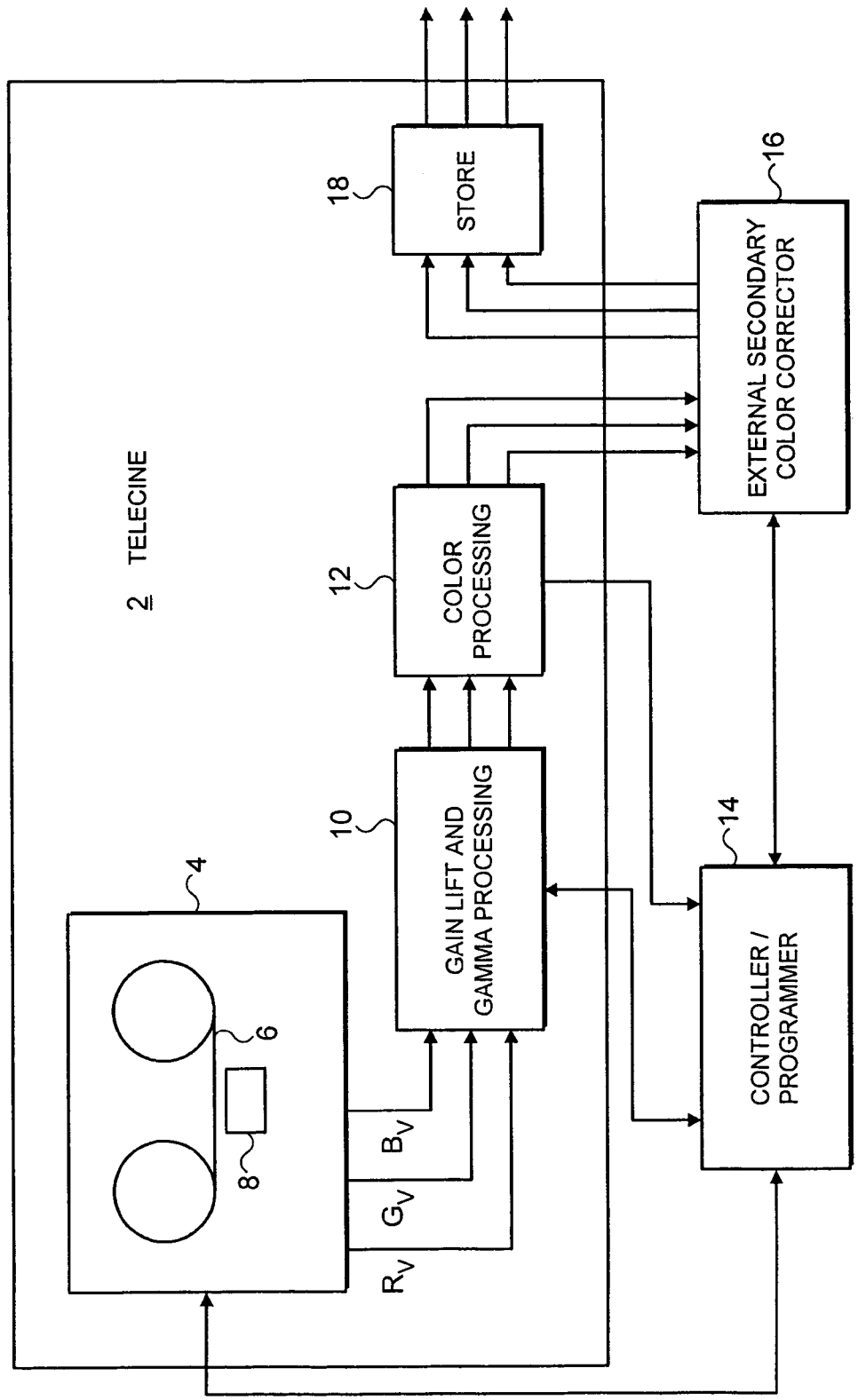
FIG. 1 is a schematic view showing a prior art system.

FIG. 1 shows a schematic block diagram of a system according to the prior art. There is shown a telecine 2 in which a film transport 4 runs a film 6 past a CRT scanner 8, which incorporates photomultipliers for generating red, green and blue component signals. Thus red, green and blue signals representing each pixel in each image corresponding to individual frames of the film are generated. Primary correction of the gain, lift and gamma of the three signals is carried out by a processor 10. Some basic colour corrections can also be carried out by a second processor 12 connected in series with the first processor 10. A controller/programmer 14 provides a control panel for the processors. The controller/programmer also includes a programming function whereby an operator can rehearse slowly, the optimum grading and picture adjustments for each scene in the film, which the programmer stores. The programmer is driven by time code, or by film footage, so it can tell one scene from another by the time code, or by the position of the film.

An example of a suitable controller/programmer is the POGLE produced by Pandora International Limited. This is designed for use with a range of telecine machines and is capable of providing a large number of control signals simultaneously, for example 96 control channels, either analog or digital. The channels can be used to control a telecine and/or other peripheral devices, such as noise reducers, VT's, still stores, mixers, and colour correctors.

As shown in FIG. 1, a secondary external colour corrector 16 is provided. This has the capability for 6 or more channel colour correction. A suitable colour corrector to be used is the DCP or Megadef, both of which are produced by pandora International Limited. In these colour correctors, the primary gain correction to the digital image data is made in the RGB domain as is described for example in granted UK Patent No. 2278514. Further colour corrections are then carried out in the colour corrector using six channels. As described in GB2278514, this can be implemented using Cache Tag RAM techniques which allow individual pixels to be corrected to be tagged so that pixels which do not require any colour correction are not processed. In an alternative method which can also be implemented via the colour corrector, 3 dimensional colour cube tables are loaded which map red, green and blue input colour signals to desired red, green and blue output colour signals. The application of these techniques is described in GB2299881.

In the colour correction systems known in the art, each channel can be used for only a single correction. Thus for example, a first channel might be used to select a particular shade of red in an image and to alter the hue thereof. If it was desired to also alter another shade of red to have the same hue then a second channel of the corrector would have to be used to do this.

Figure 2:
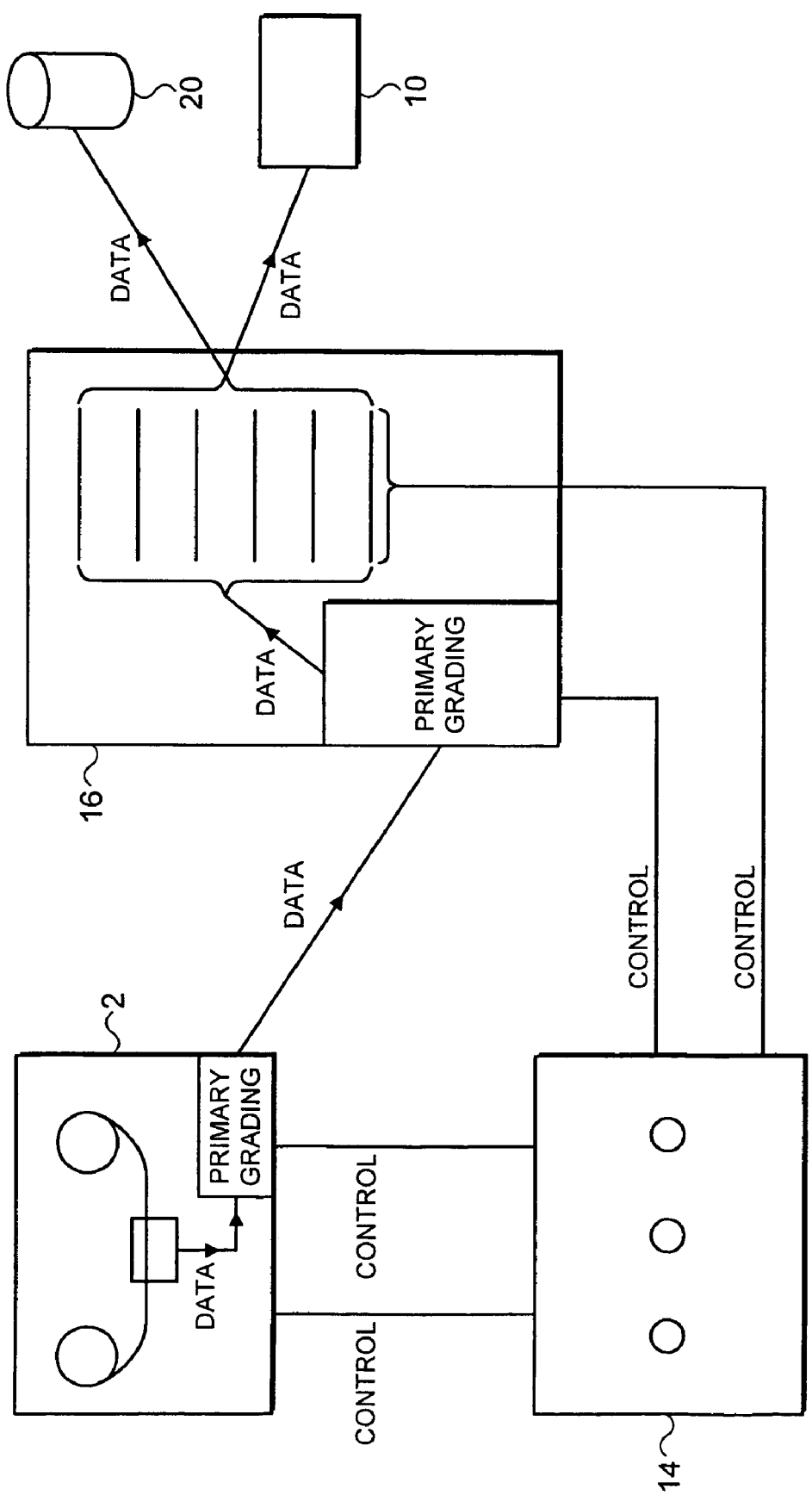
FIG. 2 is a schematic view showing a system according to the invention.

The present invention provides an improved system for making corrections to digital images. A general view of the layout of a system embodying the invention is shown in FIG. 2, in which the data output of a telecine machine 2 such as an URSA$^{RTM}$ manufactured by Cintel International Limited in Ware, England is connected to a digital video processor 16 such as a DCP or Megadef produced by Pandora International Limited. A controller such as the POGLE 14 made by Pandora International Limited is provided so as to control both the telecine and the digital video processor. Primary grading of the digital image data obtained by the telecine can be carried out in the telecine machine or in the digital video processor at the discretion of the operator. The output from the digital processor is stored on a disc or on video tape 20 and is also output to a monitor 22 such that an operator can view the effect of any colour correction made on screen.

When transferring images from cinematographic film into other media (such as television or electronically projected media) it is usually desired to make an artistic impression of the image, and there are several different categories of function within the colour correction of a film image which an operator typically needs to carry out. These are:

1) Functions that affect the whole picture such as a global change to the brightness of the whole picture;

2) Functions that remap colour, e.g. by detecting all the red areas of a picture and to make the red a bluer red;

3) Functions to delineate the picture such as a tool which allows only part of the picture to be specified. This could be achieved by drawing around an object or tracing its outline 4) Functions that operate on a part of a picture only such as a function which specifies that a colour correction is to be applied to a red dress worn by a model but not to a car which is the same shade of red;

5) Functions that can be programmed to provide a specific overall look or feel to an image; and 6) Functions which make corrections for the output media to be used. For example, the resultant imagery may be intended to be shown on an electronic cinema projector of particular colorimetry. It is necessary to correct for this particular colorimetry before sending the images to the projector, otherwise the images will not look like the monitor images.

To achieve all of these required corrections in a manner which is much more time effective and which will also produce a higher quality image, the colour correction system is configured to be used as follows.

An operator views the image to be altered on a monitor screen 10 as shown in FIG. 2. A first set of colour corrections which the operator wishes to make might be primary corrections to the overall brightness of the picture. The operator would set up the desired modifications in the standard way known in the art and a look-up table designating the changes to be made would then be stored for use in the first channel of the colour corrector. As an alternative to a look-up table, a processing parameter for the image could be stored in software. Thus, for example a command to halve the gain could simply be stored. This would clearly only be possible for corrections which were to be carried out on each pixel in the image such as overall brightness control corrections.

Next, the operator might want to alter the artistic look of the film to alter the style of image. Thus, a hot dusty desert look could be obtained by for example removing green colours and replacing them with browns as was done by the Coen brothers in their film "Oh Brother, Where art thou?". To do this, the operator selects each separate range of green colours which he wishes to change into browns and a look-up table for changing a respective range will be set up in each of a number of channels of the colour corrector. Thus, for example, two channels of the corrector could be used to tag first and second ranges of green and mark them to be replaced with brown. A third channel could be used to tag a range of dark neutrals which the operator also wished to alter to brown. In some complex cases it will be appreciated that all of the channels of the colour corrector would be needed to set up the required corrections for the look or style of the image.

In the system of the invention, once the look or style corrections to the image have been decided on and stored in the various channels of the colour corrector, they are then combined in a single look-up table in a single channel. In order to achieve this, the look-up tables in the colour corrector channels are configured in Field Programmable Gate Arrays (FPGAs). The FPGAs used are from the Virtex II Pro range available from Xilinx Corporation of San Jose, Calif., USA. Each processor may contain up to four IBM Power PC™ 405 devices, as well as a sea of gates for user configuration. Each Power PC operates at 300 MHz, and supports the IBM CoreConnect™. Normally, a single FPGA will be provided in each channel of the corrector. However, it would be possible to combine the functionality of two or more (potentially even all six) channels in a single FPGA.

To combine the look or style colour corrections to be made once they have been decided on, the operator pushes a "copy" button provided on the POGLE control panel. This has the effect in a Cache tag RAM implementation that, if a colour is tagged in any one of the Cache Tag RAMs (or look-up tables), then it is marked in a combination Cache Tag RAM which is created. Thus, the method includes the steps of:

1) Tagging a first range of colours to be converted using a first channel of a DCP;

2) Tagging a second range of colours to be converted using a second channel of the DCP. This can be altered but once the operator is satisfied, he pushes the copy button to copy channel 2 into channel 1. To do this, code is executed in a microprocessor contained with the FPGA. The logic of the code looks at the first element in each of the cache Tag RAMs and acts upon the following rules:

If the first element of the first RAM (i.e. channel 1) contains 0 and the first element of the second RAM (i.e. channel 2) contains 0 also, then the combined answer is 0

If the first element of the first RAM contains 0 and the first element of the second RAM contains 1, then the combined answer is 1

If the first element of the first RAM contains 1 and the first element of the second RAM contains 0, then the combined answer is 1

If the first element of the first RAM contains 1 and the first element of the second RAM contains 1 also, then the combined answer is 1

This process is repeated for each element of the Cache Tag RAMs (typically 1024 elements). Further, if Caches have been created for more than two channels, then each of the caches can be copied together at one time as outlined above or the operator can specify that for example, only two channels should be copied together.

It will be appreciated that using the method described above, the colour corrections can only be combined into a single look-up table if all of the picture elements are to be corrected in the same way, i.e. it would not be possible to form a single look-up table or Cache Tag RAM which made some pixels brown and other piles bluer. However, the system is highly advantageous over prior art systems in which a single look-up table could not be used to alter non-contiguous ranges of colour.

Once the corrections required for look or style have all been combined into a single channel, the look-up table for that channel is stored and the operator then uses the colour corrector to set up further corrections which might be desired. These would typically include alterations of the colour of particular objects in an image. These corrections are again combined and stored in a single channel for each type of correction to be made. Colour corrections needed for output media (such as electronic cinema projectors) correction are made using a matrix operation to correct for different colour primaries. This calibration data is stored in a separate calibration file but is utilised in conjunction with all of the other corrections to be performed.

Figure 3:
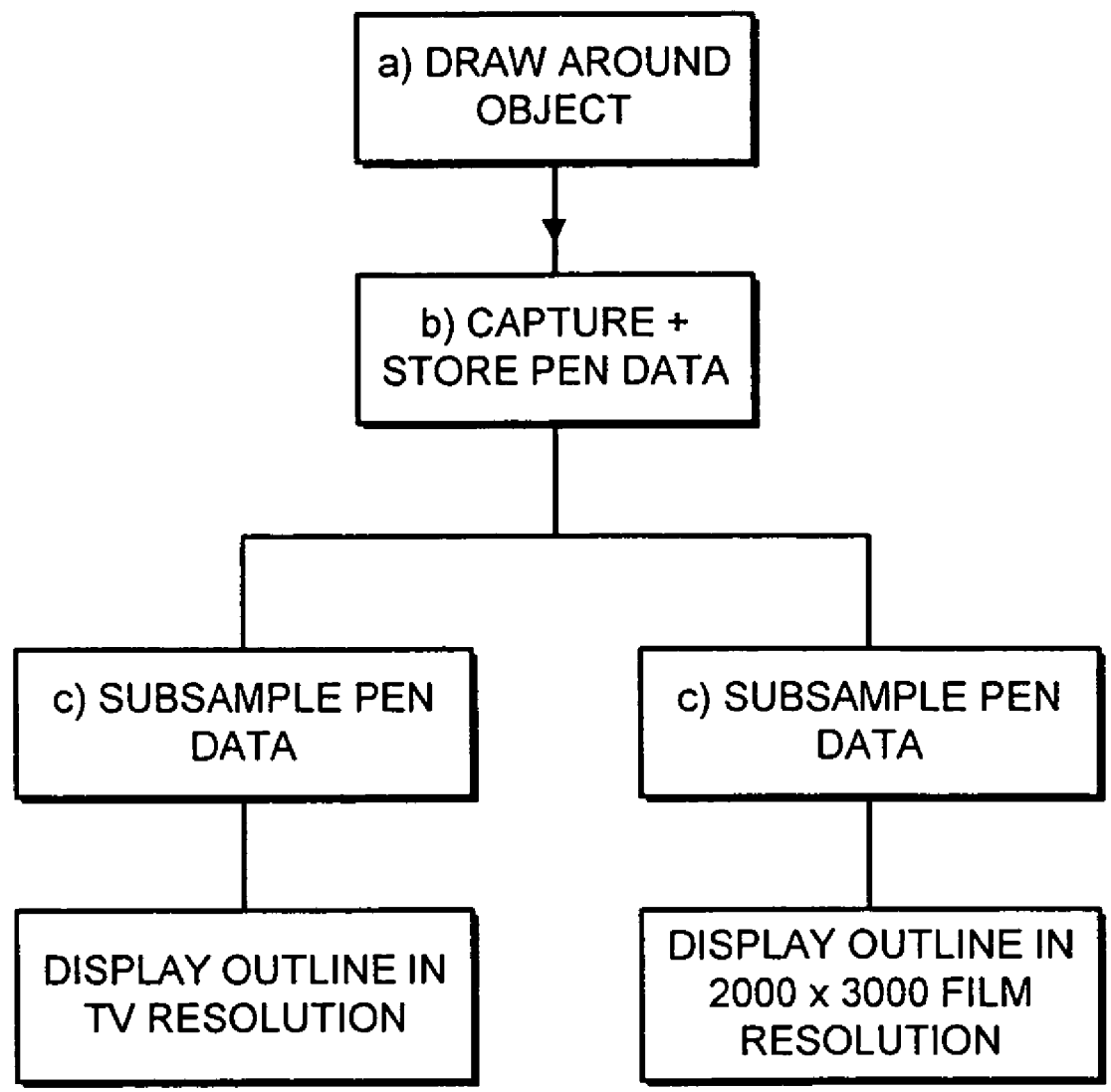
FIG. 3 is a schematic flow diagram showing a method of identifying an object in an image.

When identifying an object to be modified in an image, in some instances, the most accurate means of identifying the object is by drawing around it. This might for example be the case where the objects surrounding the object to be selected had very similar colour characteristics. The object can be drawn around by drawing the boundary of an object onto the image of each frame of film. This can be done using industry standard drawing tablets such as the INTUOS range of tablets from Wacom Technology Corporation of Vancouver, Wash. State, USA. These tablets are capable of resolutions of typically 10,000×10,000 points. This process is shown in FIG. 3. In the system of the invention, whenever an object is drawn around (step a) to identify it for alteration, the pen trail is stored (step b) at the highest possible resolution (i.e. 10,000×10,000 points) to store a "real shape" of the object. The real shape of the object is then interpolated down when it is implemented in an image depending on the resolution at which the operator is working on the image. Thus, if the operator is viewing the image at standard TV resolution of 720×576 pixels, the outline is sub sampled sown to this resolution (step c) so as to be displayed in the image. In contrast, if the operator is working on the image at a higher resolution such as 2000×3000 then the outline is subsampled down to this higher resolution as shown at step d. Although not shown in the Figures, it will be appreciated that the system includes means for determining the resolution at which an image is being displayed or worked on so as to decide the resolution to which the shape data should be sub sampled. Typically, this can be done by the POGLE programmer/controller.

An example of a set of images and the way in which corrections are made to them using the system of the invention now follows. The film in question contains a full range of colours, but is under exposed. In the film sequence being considered, a red car is passing from left to right. It is desired to change the colour of the car but not change a identical colour dress that a model is wearing on the extreme right of the scene. The car passes behind the model. It is also desired to correct for the underexposure, and add the desert "look/style" as discussed above. It is intended to produce data for electronic cinema projection on a projector of known colorimetry. The operator will be viewing files on a standard definition monitor, but the source data is at 2000× 3000 film resolution. To make the corrections, the operator will undertake a number of distinct stages.

The first stage will be to set up corrections for the under exposure of the film. This will be done by manipulation of the gain, lift and gamma. When the operator is happy with the corrections viewed on screen, he stores the parameters as a first set of corrections.

The second stage is to identify the car. To do this the operator could click the mouse onto the car and the shape of the car could then be found in all frames using techniques explained in GB 2317298.

Alternatively, a box could be drawn around the car using the method described above. Colour correction to be made for the car can then be set up and stored.

Next, the operator loads a desert look or style colour correction set created using several channels of a colour corrector as described above.

Finally, the operator applies the matrix required for the electronic cinema projection characteristics.

An overall single image transform is then created using the Cache Tag RAM copying technique so that all the various corrections can be applied using as few channels of the colour corrector as possible.

It will be appreciated that the embodiments described above are preferred embodiments only of the invention such that they should not be taken as being limiting. Various alterations could be made to the embodiments described which would still fall within the scope of the invention. For example, it would in some cases be possible to combine all the various colour corrections to be made into a single look-up table in one channel of a colour processor. For computational reasons however it has been found that it can be simpler to keep different categories of colour correction such as look/style corrections and overall brightness correction separate.

What is claimed is:

1. A method of producing a video product for viewing by an audience, comprising the steps of scanning cinematographic film to produce digital images corresponding to images on frames of the film, modifying the digital images, and creating the video product from the modified digital images; in which:
   (a) the film is scanned, in a first scanning step, to produce original digital images, which are stored;
   (b) the stored original digital images are viewed on a monitor screen by an editing operative and the editing operative selects a first set of colour attribute modifications to be applied to the original digital images, to create firstly modified images for inclusion in the video product, the firstly modified images being viewed by the editing operative on the monitor screen;
   (c) a first set of colour attribute modification parameters corresponding to the first set of colour attribute modifications are stored in a colour corrector;
   (d) the firstly modified images are viewed on a monitor screen by an editing operative and the editing operative selects a second set of colour attribute modifications to be further applied to the firstly modified images, to create secondly modified images for inclusion in the video product, the secondly modified images being viewed by the editing operative on the monitor screen;
   (e) a second set of colour attribute modification parameters corresponding to the second set of colour attribute modifications are stored in a colour corrector;
   (f) the cinematographic film is re-scanned, in a second scanning step, to produce a new set of digital image data distinct from the original digital images, and the new digital image data is processed by the colour corrector so as to apply the modifications defined by the first and second set of colour attribute modification parameters; and
   (g) the modified digital image data is used to create said video product for viewing by an audience, the video product thereby incorporating the modifications; wherein:
   (h) the colour corrector is a multi channel colour corrector;
   (i) the first set of colour attribute modification parameters are defined in a first channel of the colour corrector;
   (j) the second set of colour attribute modification parameters are defined in a second channel of the colour corrector; and
   (k) the first and second set of colour attribute modification parameters are combined in a single channel of the colour corrector and are applied to the new digital image data at the same time using a channel of the colour corrector.

2. A method as claimed in claim 1, wherein each of the sets of colour attribute modification parameters are defined by a respective look-up table and the respective look-up tables are combined into a single look-up table when the colour attribute modification parameters are combined.

3. A method as claimed in claim 1, wherein at least one further set of colour attribute modification parameters is defined, the further set of colour attribute modification parameters being combined into the single channel of the colour corrector with the first and second colour attribute modification parameters.

4. A method as claimed in claim 3, wherein the first set of colour attribute modification parameters define a change to be made to a contiguous range of colours in the image, the second set of colour attribute modification parameters define a second contiguous range of colours to be changed, and the further set(s) of colour attribute modification parameters define further contiguous ranges of colours to be changed.

5. A method as claimed in claim 1, wherein the first set of colour attribute modification parameters define a change to be made to a contiguous range of colours in the image and the second set of colour attribute modification parameters define further contiguous ranges of colours to be changed.

* * * * *